(12) United States Patent
Li

(10) Patent No.: US 10,419,958 B2
(45) Date of Patent: Sep. 17, 2019

(54) WIRELESS COMMUNICATION CONTROL METHOD AND DEVICE IN WIRELESS COMMUNICATION CONTROL SYSTEM, AND WIRELESS COMMUNICATION DEVICE

(71) Applicant: NEC Corporation, Minato-ku, Tokyo (JP)

(72) Inventor: Tansheng Li, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/301,852

(22) PCT Filed: Apr. 15, 2015

(86) PCT No.: PCT/JP2015/002082
§ 371 (c)(1),
(2) Date: Oct. 4, 2016

(87) PCT Pub. No.: WO2015/162878
PCT Pub. Date: Oct. 29, 2015

(65) Prior Publication Data
US 2017/0026862 A1  Jan. 26, 2017

(30) Foreign Application Priority Data
Apr. 25, 2014  (JP) .................. 2014-091965

(51) Int. Cl.
*H04W 24/08* (2009.01)
*H04W 88/02* (2009.01)
(Continued)

(52) U.S. Cl.
CPC ............ *H04W 24/08* (2013.01); *H04B 17/26* (2015.01); *H04B 17/30* (2015.01); *H04B 17/318* (2015.01);
(Continued)

(58) Field of Classification Search
CPC ..... H04W 24/08; H04W 64/00; H04W 88/02; H04W 52/228; H04W 72/085; H04B 17/26; H04B 17/30; H04B 17/318; H04B 17/373
(Continued)

(56) References Cited

U.S. PATENT DOCUMENTS 9,748,989 B1*  8/2017  Freedman ................ H04B 1/12
2003/0130004 A1*  7/2003  Esmailzadeh ......... H04W 52/24
455/522
2011/0143656 A1*  6/2011  Dankberg .......... H04B 7/18539
455/10

FOREIGN PATENT DOCUMENTS

CN  103414674  11/2013
CN  103650602   3/2014
(Continued)

OTHER PUBLICATIONS

Russian Office Action for RU Application No. 2016146093108 dated Dec. 25, 2017 with English Translation.
(Continued)

*Primary Examiner* — Obaidul Huq

(57) ABSTRACT

An object of the present invention is to provide a wireless communication control method and a device, and a wireless communication apparatus which can control wireless line quality appropriately according to a weather change without adding special equipment.
Therefore, in the present invention, a wireless communication control device includes an attenuation amount estimation unit to estimate a future attenuation amount from history of an attenuation amount of radio field intensity to a wireless communicator from another wireless communicator, and a control unit to control the wireless communicator based on the estimated attenuation amount.

13 Claims, 11 Drawing Sheets

(51) Int. Cl.
    *H04B 17/30* (2015.01)
    *H04W 64/00* (2009.01)
    *H04B 17/26* (2015.01)
    *H04B 17/318* (2015.01)
    *H04B 17/373* (2015.01)
    *H04W 72/08* (2009.01)
    *H04W 52/22* (2009.01)

(52) U.S. Cl.
    CPC .......... *H04B 17/373* (2015.01); *H04W 64/00* (2013.01); *H04W 88/02* (2013.01); *H04W 52/228* (2013.01); *H04W 72/085* (2013.01)

(58) Field of Classification Search
    USPC .................................................. 370/241, 252
    See application file for complete search history.

(56) References Cited

FOREIGN PATENT DOCUMENTS

| JP | H08-223086 A | 8/1996 |
|---|---|---|
| JP | 2000-036784 A | 2/2000 |
| JP | 2003-318795 A | 11/2003 |
| JP | 2003318795 | 11/2003 |
| JP | 2004-354080 A | 12/2004 |
| JP | 2004-363679 A | 12/2004 |
| JP | 2004354080 | 12/2004 |
| JP | 2007-221357 A | 8/2007 |
| JP | 2015-201795 A | 11/2015 |
| WO | 2010144918 | 12/2010 |

OTHER PUBLICATIONS

Recommendation ITU-R P. 838 by Radiocommunications Sector of International Telecommunication Union.
International Search Report for PCT Application No. PCT/JP2015/002082, dated Jul. 7, 2015.
English translation of Written opinion for PCT Application No. PCT/JP2015/002082.
Japanese Office Action for JP Application No. 2016-514700 dated Jan. 22, 2019 with English Translation.
First office action for Chinese counterpart application No. CN201580022095 dated Mar. 22, 2019.
Japanese Office Action for JP Application No. 2016-514700 dated Jul. 2, 2019 with English Translation.

* cited by examiner

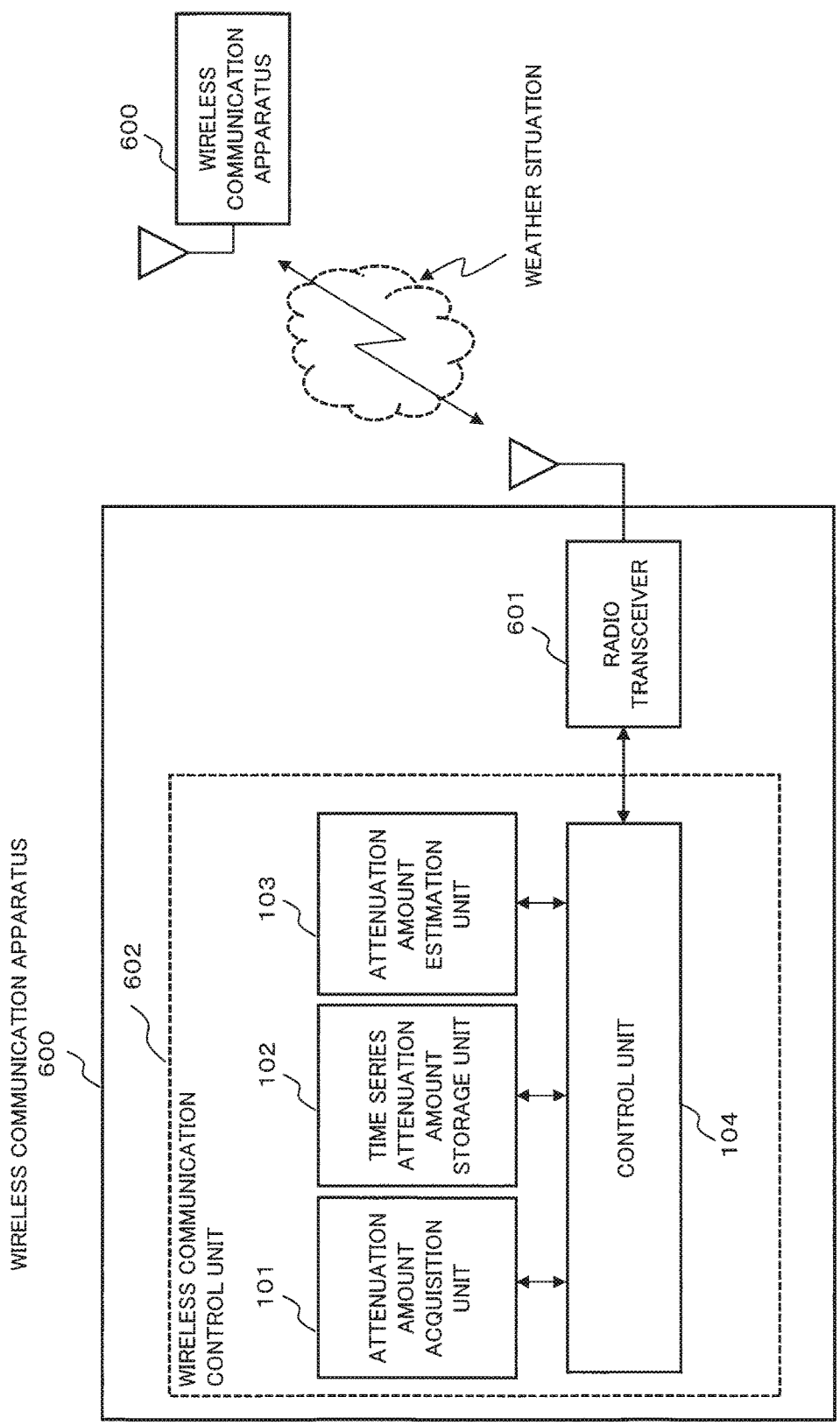

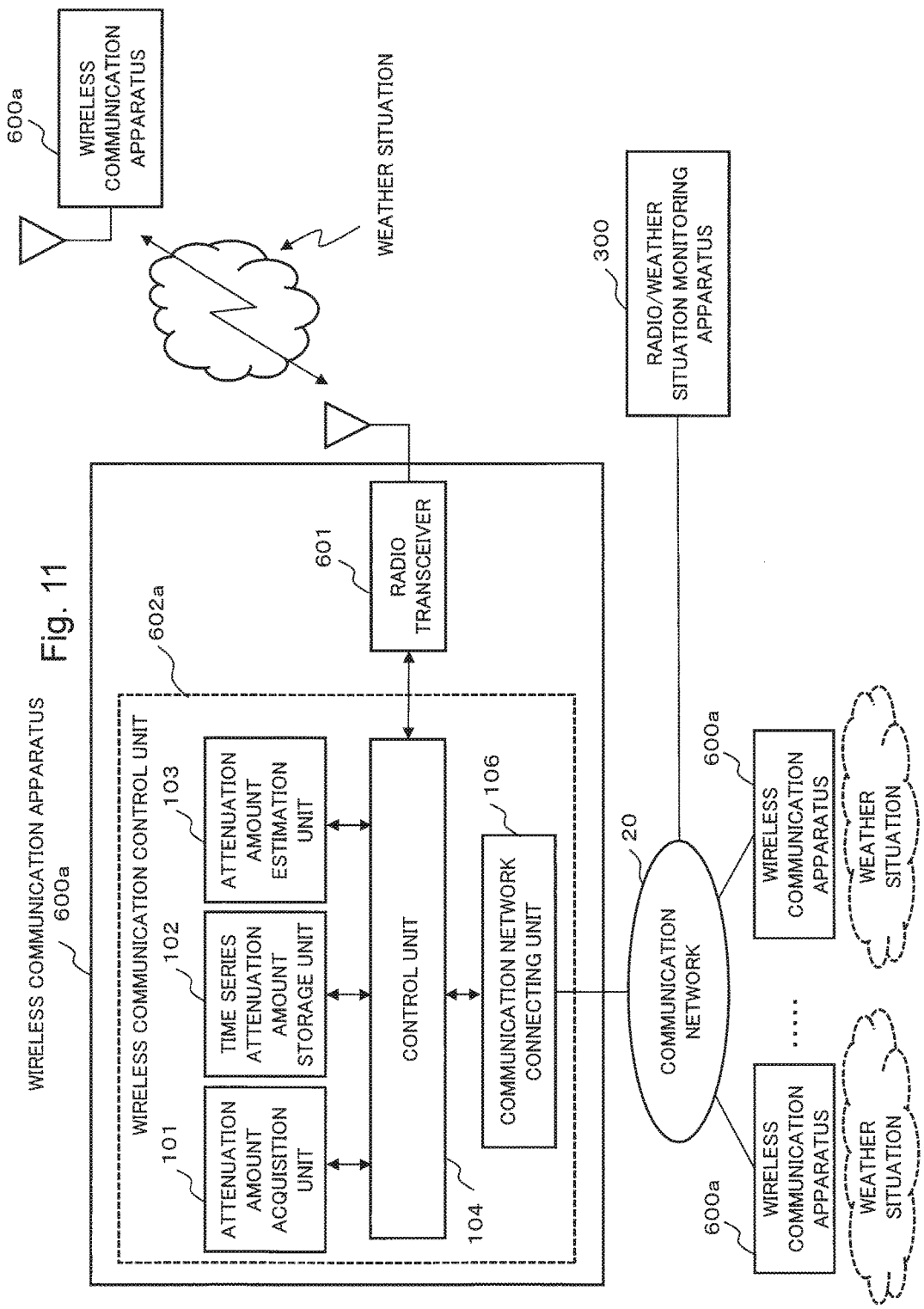

WIRELESS COMMUNICATION CONTROL METHOD AND DEVICE IN WIRELESS COMMUNICATION CONTROL SYSTEM, AND WIRELESS COMMUNICATION DEVICE

This application is a National Stage Entry of PCT/JP2015/002082 filed on Apr. 15, 2015, which claims priority from Japanese Patent Application 2014-091965 filed on Apr. 25, 2014, the contents of all of which are incorporated herein by reference, in their entirety.

TECHNICAL FIELD

The present invention relates to a wireless communication system, and, more particularly, to a wireless communication control technology in an environment where the radio field intensity attenuates according to a weather situation, and a wireless communication apparatus using it.

BACKGROUND ART

The radio field intensity of a frequency of the microwave band or higher is influenced by a weather situation such as rain, fog and humidity greatly, and it is known that, in the submillimeter wave zone and the millimeter wave zone of 10 GHz or more in particular, a radio field intensity attenuates greatly by rainfall and snowfall. For example, according to non-patent literature 1, relation between an attenuation factor $\gamma_R$ (dB/km) and a rainfall amount R (mm/h) per a unit time is expressed in following equation (1).

$$\gamma_R = kR^\alpha \quad (1)$$

Here, k and α are coefficients that depend on a frequency of a radio wave. Attenuation of radio field intensity caused by such weather situation degrades wireless line quality, and, thus, various kinds of technologies to suppress or evade such influence have been proposed.

For example, in a radio apparatus disclosed in patent literature 1, a sensor which acquires weather information such as rainfall, snowfall and humidity is provided, and a radio frequency and a modulation method are controlled according to the acquired weather information so as to achieve good communication quality. In a line band controller disclosed in patent literature 2, a rainfall intensity distribution and a moving speed are estimated from rainfall information obtained in advance, and a line band is controlled so that deterioration of wireless line quality by this may be evaded.

CITATION LIST

Patent Literature

[PTL 1] Japanese Patent Application Laid-Open No. 2003-318795
[PTL 2] Japanese Patent Application Laid-Open No. 2004-363679
[PTL 3] Japanese Patent Application Laid-Open No. 2007-221357
[PTL 4] Japanese Patent Application Laid-Open No. 2004-354080
[PTL 5] Japanese Patent Application Laid-Open No. 2000-036784

Non Patent Literature

[NPL 1] Recommendation ITU-R P. 838 by Radiocommunications Sector of International Telecommunication Union

SUMMARY OF INVENTION

Technical Problem

However, in a radio apparatus disclosed in patent literature 1, there are problems that a sensor which acquires weather information is needed to be provided newly, and, thus, a structure of the radio apparatus is complicated and its cost is high. In a line band controller disclosed in patent literature 2, rainfall information needs to be obtained from outside in advance and estimation accuracy depends on accuracy of rainfall information, and, therefore, it is not possible to cope with a local and sudden weather change. Furthermore, there is also a difficulty that a processing load of the apparatus is large because a rainfall intensity distribution and a moving speed need to be estimated from rainfall information using image processing technique.

Accordingly, an object of the present invention is to provide a wireless communication control method, a wireless communication control device and a wireless communication apparatus, which can control wireless line quality appropriately according to a weather change without adding special equipment.

Solution to Problem

A wireless communication control device according to the present invention includes an attenuation amount estimating means for estimating a future attenuation amount from history of an attenuation amount of radio field intensity from another wireless communicator to the wireless communicator; and a control means for controlling the wireless communicator based on the estimated attenuation amount.

A wireless communication control method according to the present invention estimates, by an attenuation amount estimating means, a future attenuation amount from history of an attenuation amount of radio field intensity to a wireless communicator from another wireless communicator; and controls, by a control means, the wireless communicator based on the estimated attenuation amount.

A wireless communication system according to the present invention is a wireless communication system including a wireless communicator and a wireless communication control device to control the wireless communicator, the system including: an attenuation amount estimating means for estimating a future attenuation amount from history of an attenuation amount of radio field intensity from another wireless communicator to the wireless communicator; and a control means for controlling the wireless communicator based on the estimated attenuation amount.

A wireless communication apparatus according to the present invention is a wireless communication apparatus capable of performing wireless communication with another wireless communication apparatus, the wireless communication apparatus including: a wireless communication means for performing wireless communication; an attenuation amount estimating means for estimating a future attenuation amount from history of an attenuation amount of radio field intensity from the other wireless communication apparatus to the wireless communication apparatus; and a control means for controlling the wireless communication means based on the estimated attenuation amount.

Advantageous Effects of Invention

According to the present invention, wireless line quality can be controlled appropriately according to a weather change without adding special equipment, because a future attenuation value is estimated from attenuation amounts of radio field intensity in time series and wireless communication control is carried out based on the estimated value.

BRIEF DESCRIPTION OF DRAWINGS

FIG. 10 is a block diagram showing a schematic structure of a wireless communication control device in a wireless communication system according to a sixth exemplary embodiment of the present invention.

FIG. 11 is a block diagram showing a schematic structure of a wireless communication control device in a wireless communication system according to a seventh exemplary embodiment of the present invention.

DESCRIPTION OF EMBODIMENTS

Summary of Embodiments

According to exemplary embodiments of the present invention, a future attenuation value is estimated from radio field intensity attenuation amounts stored in time series, and wireless communication control is carried out based on the estimated value. Since a future attenuation amount is estimated from time series attenuation amounts up to the present, high accuracy estimation is possible for a sudden weather change. In addition, special equipment does not need to be added, and a processing load is reduced. Hereinafter, exemplary embodiments of the present invention will be described in detail with reference to a drawing.

1. First Exemplary Embodiment 1.1) System Configuration

Figure 1:
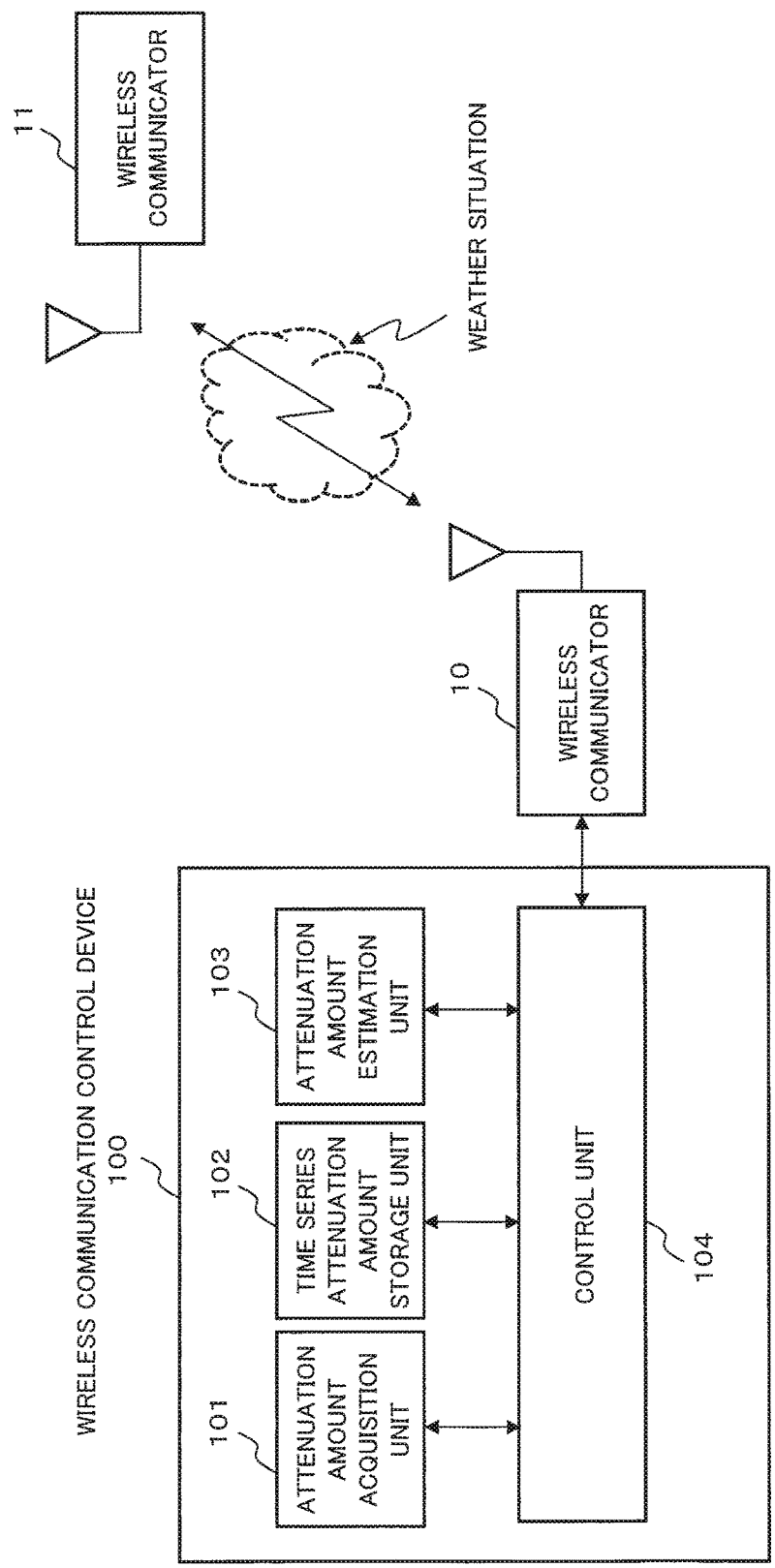
FIG. 1 is a block diagram showing a schematic structure of a wireless communication control device in a wireless communication system according to a first exemplary embodiment of the present invention.

As shown in FIG. 1, in a wireless communication system according to the first exemplary embodiment of the present invention, it is supposed that a wireless communicator 10 and a wireless communicator 11 perform wireless communication, and that a wireless communication control device 100 controls wireless communication parameters (transmission power, a modulation method and a bandwidth to be used) of the wireless communicator 10.

Although various weather situations (rainfall, snowfall and humidity and the like) which make radio field intensity attenuate are anticipated between the wireless communicator 10 and the wireless communicator 11, presence or absence of precipitation including rainfall and snowfall will be considered, hereinafter.

The wireless communication control device 100 has a function to control wireless communication parameters of the wireless communicator 10, and includes an attenuation amount acquisition unit 101, a time series attenuation amount storage unit 102, an attenuation amount estimation unit 103 and a control unit 104 as functional elements. As will be described next, the control unit 104 controls the attenuation amount acquisition unit 101, the time series attenuation amount storage unit 102 and the attenuation amount estimation unit 103, and performs most suitable control of the wireless communication function of the wireless communicator 10 according to a weather situation. Meanwhile, the same functions as the attenuation amount acquisition unit 101, the attenuation amount estimation unit 103 and the control unit 104 can be realized by executing a program stored in a storage device, which is not illustrated, on a computer or a CPU.

1.2) Operations

Figure 2:
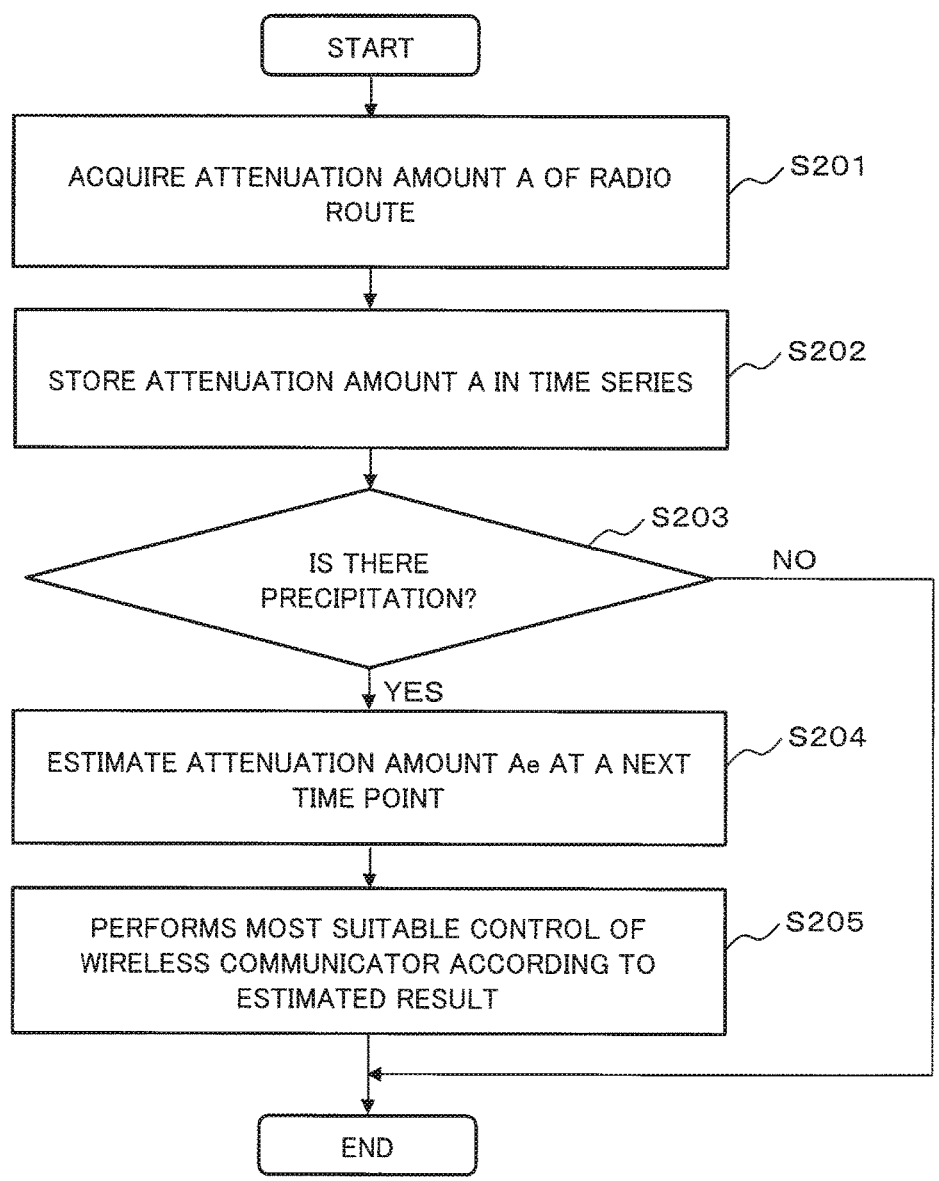
FIG. 2 is a flow chart showing a wireless communication control method according to the first exemplary embodiment.

In FIG. 2, the attenuation amount acquisition unit 101 acquires present attenuation amount A that is occurring between the wireless communicator 10 and 11 at given regular time intervals (operation S201). Attenuation amount A acquired successively is stored in the time series attenuation amount storage unit 102 in time series (operation S202). Meanwhile, attenuation amount A may be calculated from a transmission power value notified of from the transmitting end and a measured value of received power at the receiving end, for example. When the transmission power value of the transmitting end cannot not obtained, it is possible to perform presumption using a received-power reference value at the time of a clear sky set in advance and a received power value. In other words, attenuation amount A is calculable as a difference with an attenuation value at the time of a clear sky. Radar data can be also used. For example, attenuation amount A in time series is simulated by radar data, and the simulated result is stored in the time series attenuation amount storage unit 102. This simulated result may be used as training data of machine learning.

The control unit 104 compares acquired present attenuation amount A and a predetermined attenuation threshold value, and distinguishes whether precipitation is occurring or not (operation S203). When attenuation amount A exceeds the attenuation threshold value, it is determined that rainfall or snowfall is occurring between the wireless communicators 10 and 11. When precipitation is occurring (in operation S203; YES), the attenuation amount estimation unit 103 extracts a change in an attenuation amount from time series attenuation amounts stored in the time series attenuation amount storage unit 102, and estimates attenuation amount Ae at a time point of next acquisition or at a time point in the future (operation S204) according to control of the control unit 104. For extraction of this attenuation amount change, a machine learning method such as a neural network method can be used, for example.

Next, according to estimated attenuation amount Ae, the control unit 104 performs most suitable control of wireless communication parameters of the wireless communicator 10 (operation S205) so that good communication may be maintained. For example, it is possible to increase transmission power of the wireless communicator 10 so that an attenuation amount to be estimated may be reduced, or to change to a bandwidth or to a modulation method with which attenuation by precipitation can be made smaller. More specifically, a communication quality index such as CNR (Carrier Noise Ratio), Eb/N0 (Energy per Bit to Noise power spectral density ratio) and BER (Bit Error Rate) at estimated attenuation amount Ae is calculated, and, based on the calculation result, any one of or both of a modulation scheme and a frequency to be used are controlled. Meanwhile, when the attenuation amount is below the attenuation threshold value (in operation S203; NO), it is determined that precipitation is not occurring, and estimation of an attenuation amount and update of wireless communication parameters is not carried out.

1.3) Effect

As mentioned above, since a future attenuation amount is estimated from time series attenuation amounts up to the present according to this exemplary embodiment, wireless communication parameters of a wireless communicator can be controlled in advance before attenuation of a radio field intensity by a large weather change occurs, and a communication failure can be evaded from happening.

2. Second Embodiment 2.1) System Configuration

Figure 3:
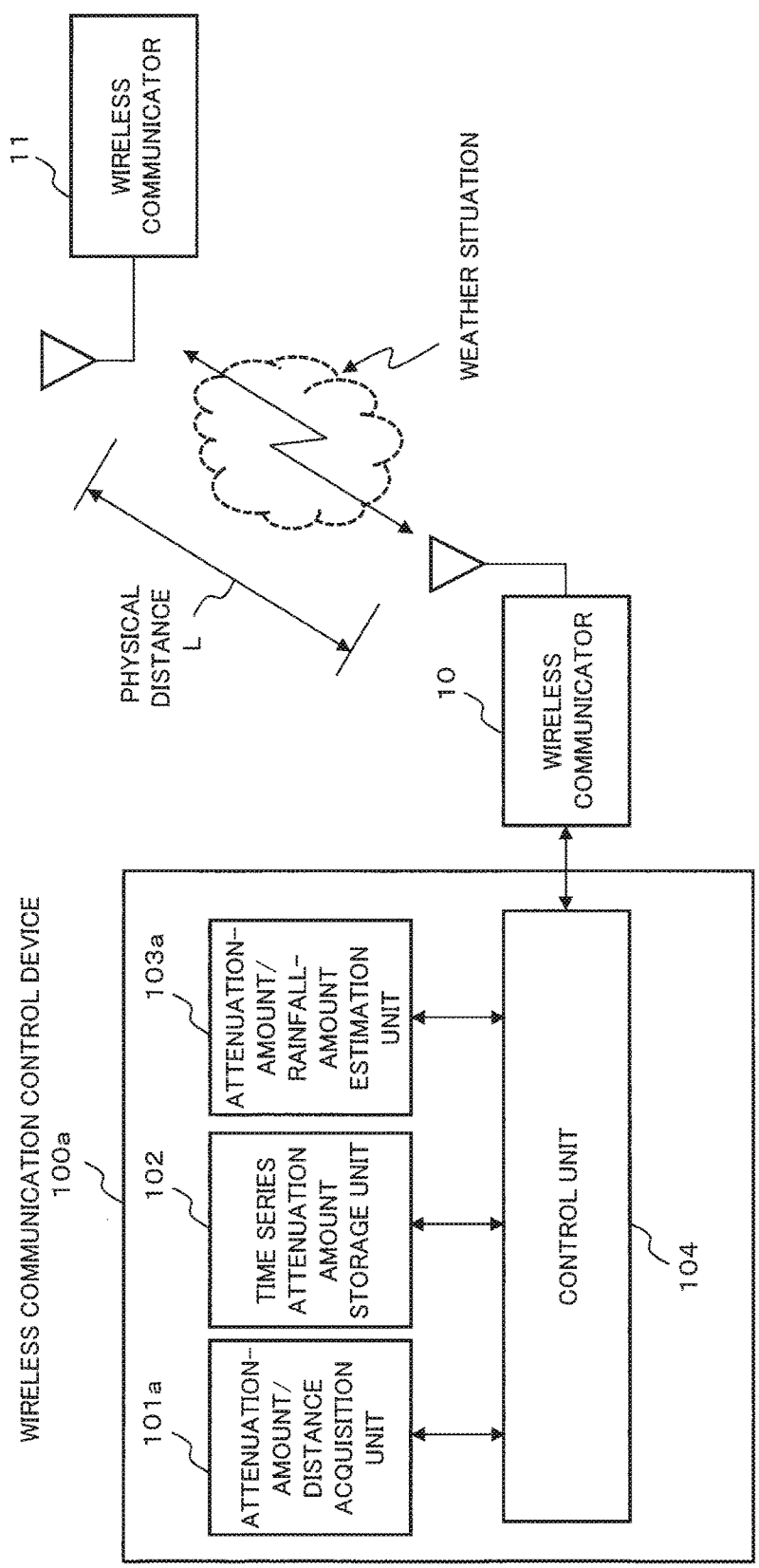
FIG. 3 is a block diagram showing a schematic structure of a wireless communication control device in a wireless communication system according to a second exemplary embodiment of the present invention.

As shown in FIG. 3, in a wireless communication system according to the second exemplary embodiment of the present invention, the wireless communicator 10 and the wireless communicator 11 perform wireless communication like the first exemplary embodiment, and it is supposed that a wireless communication control device 100a controls wireless communication parameters (transmission power, a modulation method and a bandwidth to be used) of the wireless communicator 10. Although the wireless communicator 10 and the wireless communicator 11 are away from each other by physical distance L, and various weather situations (rainfall, snowfall and humidity) which make radio field intensity attenuate are anticipated on the way, presence or absence of precipitation including rainfall and snowfall will be considered, hereinafter.

The wireless communication control device 100a has a function to control wireless communication parameters of the wireless communicator 10, and includes, as functional elements, an attenuation-amount/distance acquisition unit 101a, the time series attenuation amount storage unit 102, an attenuation-amount/rainfall-amount estimation unit 103a and the control unit 104. As will be described next, the control unit 104 controls the attenuation-amount/distance acquisition unit 101a, the time series attenuation amount storage unit 102 and the attenuation-amount/rainfall-amount estimation unit 103a, and performs most suitable control of the wireless communication function of the wireless communicator 10 according to a weather situation. Meanwhile, the same functions as those of the attenuation-amount/distance acquisition unit 101a, the attenuation-amount/rainfall-amount estimation unit 103a and the control unit 104 can be realized by executing a program stored in a storage device, which is not illustrated, on a computer or a CPU.

2.2) Operations

Figure 4:
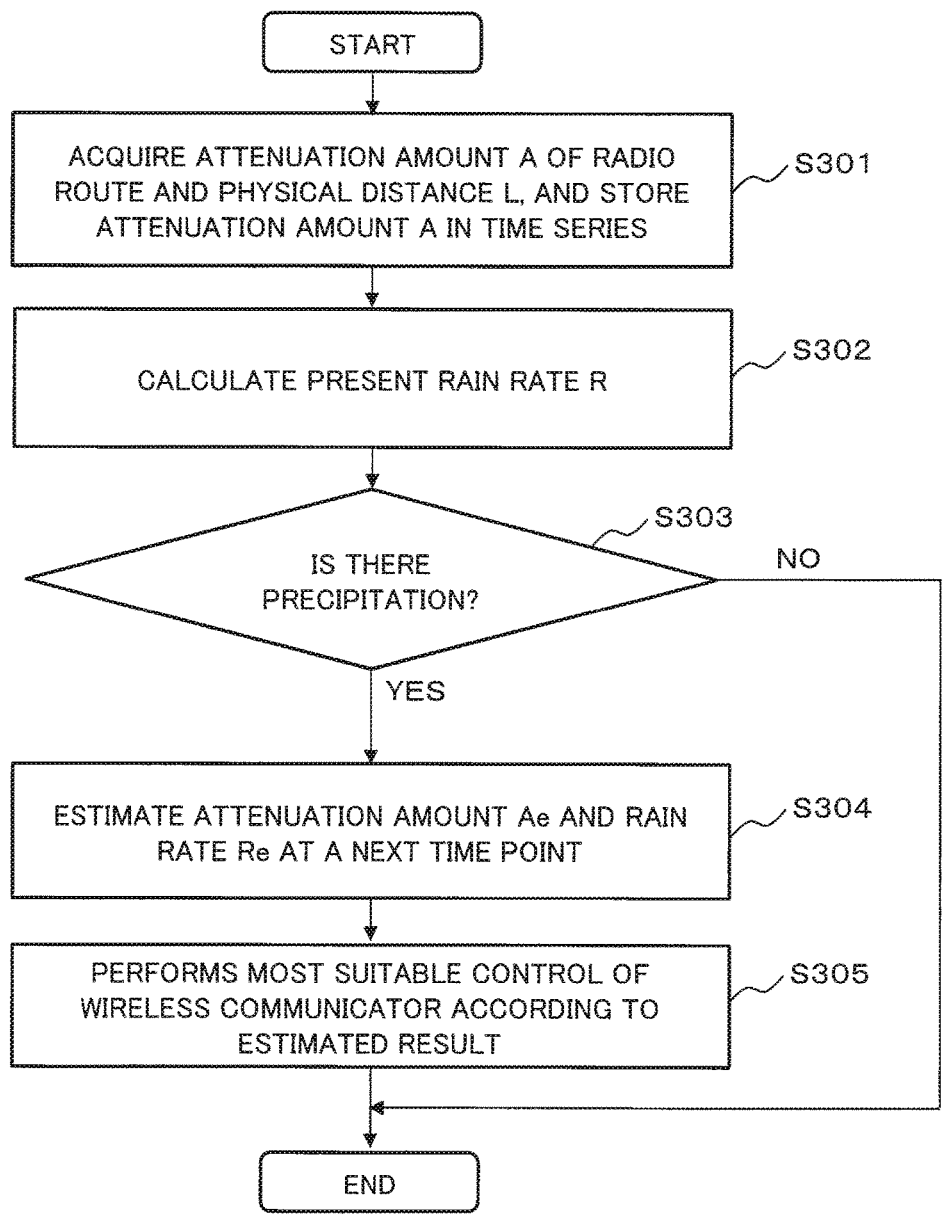
FIG. 4 is a flow chart showing a wireless communication control method according to the second exemplary embodiment.

In FIG. 4, the attenuation-amount/distance acquisition unit 101a acquires physical distance L between the wireless communicators 10 and 11 and present attenuation amount A that is occurring between the wireless communicators 10 and 11 at predetermined regular time intervals, and stores the acquired attenuation amount and distance in the time series attenuation amount storage unit 102 in time series (operation S301). As mentioned above, attenuation amount A may be calculated from a transmission power value notified from the transmitting end and a measured value of received power at the receiving end, for example. When a transmission power value of the transmitting end cannot be obtained, it is also possible to perform presumption using a received-power reference value at the time of a clear sky set in advance and a received power value. Radar data can be also used.

The control unit 104 can obtain attenuation factor $\gamma_R$ (dB/km)=A/L using acquired current attenuation amount A (dB) and the above-mentioned physical distance L (km), and, thus, it calculates present rain rate R (mm/h) using the following equation (2) (operation S302).

$$\gamma_R = A/L = kR^\alpha \qquad (2)$$

Next, the control unit 104 compares the calculated rain rate R and a predetermined threshold value, and distinguishes whether precipitation is occurring or not (operation S303). When the rain rate R exceeds the threshold value, it is determined that rainfall or snowfall is occurring between the wireless communicators 10 and 11. When precipitation is occurring (in operation S303; YES), the attenuation-amount/rainfall-amount estimation unit 103a extracts a change in an attenuation amount from time series attenuation amounts stored in the time series attenuation amount storage unit 102, and estimates attenuation amount Ae and rain rate Re at a time point of next acquisition or at a time point in the future (operation S304) according to control of the control unit 104.

Next, according to the estimated attenuation amount Ae, the control unit 104 performs most suitable control of wireless communication parameters of the wireless communicator 10 (operation S305) so that good communication may be maintained. For example, it is possible to increase transmission power of the wireless communicator 10 so that an attenuation amount to be estimated may be reduced, or to change to a bandwidth or to a modulation method with which attenuation by precipitation can be made smaller. Meanwhile, when rain rate R is equal to or less than the threshold value (in operation S303; NO), it is determined that precipitation is not occurring, and estimation of an attenuation amount and a rain rate and update of wireless communication parameters is not performed.

2.3) Effect

As mentioned above, since a future attenuation amount is estimated from time series attenuation amounts up to the present, this exemplary embodiment has the same effect as that of the first exemplary embodiment, and, furthermore, it is possible to calculate a rainfall rate and an estimated value of rainfall rate using a physical distance between the wireless communicator.

3. Third Exemplary Embodiment

3.1) System Configuration

Figure 5:
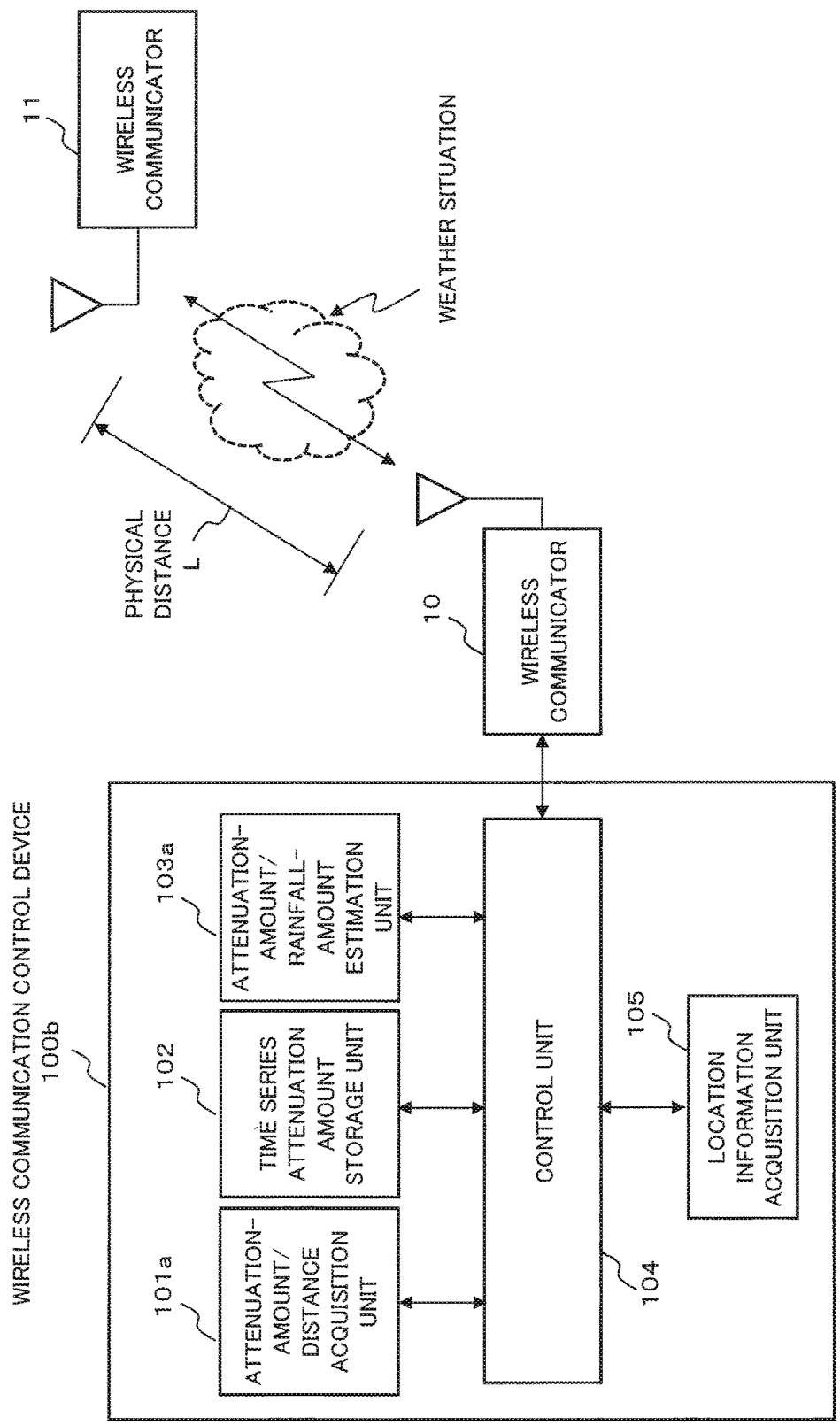
FIG. 5 is a block diagram showing a schematic structure of a wireless communication control device in a wireless communication system according to a third exemplary embodiment of the present invention.

As shown in FIG. 5, a wireless communication control device 100b according to the third exemplary embodiment of the present invention has a structure made by adding a location information acquisition unit 105 to the wireless communication control device 100a according to the second exemplary embodiment. Accordingly, the identical reference numbers are attached to blocks having the same functions as those of FIG. 3, and detailed description of them will be omitted.

The location information acquisition unit 105 acquires geographical location information on the wireless communicators 10 and 11. A geographical location of each wireless communicator can be measured by various methods. When both the wireless communicators 10 and 11 are stationary, longitude and latitude information of their installation sites can be used. When either one of the wireless communicators is a mobile station, a GPS (Global Positioning System) receiver or the like may be installed in the mobile station or a position may be identified using reception radio waves from no smaller than three nearest stationary wireless communicators (base stations). Meanwhile, location information on the wireless communicator 11 can be acquired by a location information acquisition unit installed in a wireless communication control device (not shown) which is being connected with the wireless communicator 11. The wireless communicator 10 can receive location information on the other wireless communicator 11 by a control message.

3.2) Operations

Figure 6:
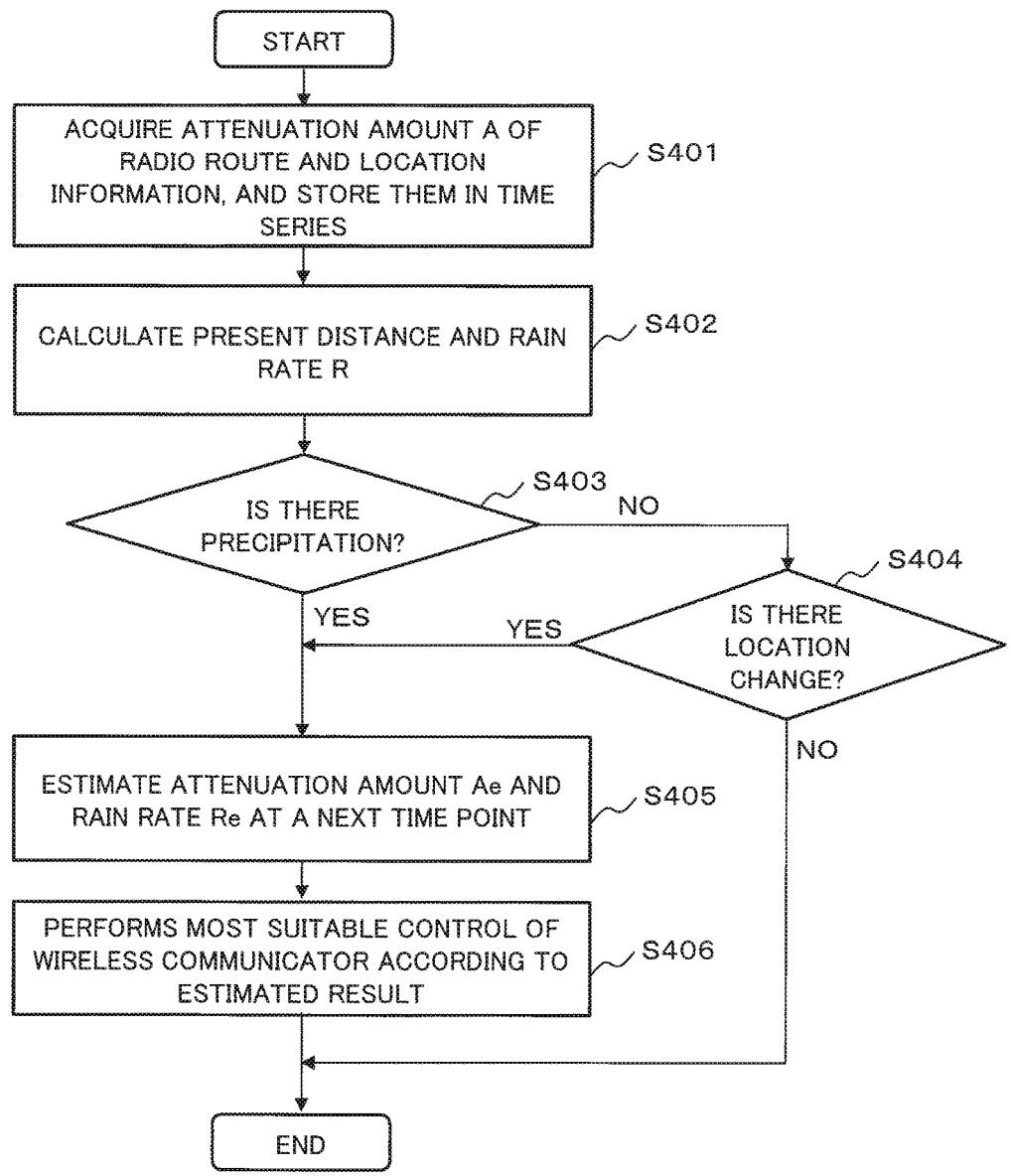
FIG. 6 is a flow chart showing a wireless communication control method according to the third exemplary embodiment.

In FIG. 6, the attenuation-amount/distance acquisition unit 101a acquires current geographical location information of the wireless communicators 10 and 11 and current attenuation amount A occurring between the wireless communicators 10 and 11 in a predetermined regular time interval, and stores the acquired attenuation amount and location information in the time series attenuation amount storage unit 102 in time series (operation S401). As mentioned above, attenuation amount A may be calculated from a transmission power value notified of from the transmitting end and a measured value of received power at the receiving end, for example. When a transmission power value of the transmitting end cannot be obtained, it is possible to perform presumption using a received-power reference value at the time of a clear sky set in advance and a received power value. Radar data can be also used.

The control unit 104 calculates current physical distance L (km) between the wireless communicators 10 and 11 from the respective pieces of geographical location information on the wireless communicators 10 and 11, and calculates current rain rate R (mm/h) using Formula (2) (operation S402) as stated in the second exemplary embodiment.

Next, the control unit 104 compares the calculated rain rate R and a predetermined threshold value, and distinguishes whether precipitation is occurring or not (operation S403). When the rain rate R is equal to or less than the threshold value (in operation S403; NO), it is distinguished whether the current pieces of location information of the wireless communicators 10 and 11 have been changed or not from those of the previous acquisition time (operation S404), next. When precipitation is occurring or there has been a position change (in operation S403; YES, or in operation S404; YES), the attenuation-amount/rainfall-amount estimation unit 103a extracts a change in an attenuation amount from the time series attenuation amounts stored in the time series attenuation amount storage unit 102, and estimates attenuation amount Ae and rain rate Re at a time point of next acquisition or at a time point in the future (operation S405) according to control of the control unit 104.

Next, according to the estimated attenuation amount Ae, the control unit 104 performs most suitable control of wireless communication parameters of the wireless communicator 10 (operation S406) so that good communication may be maintained. For example, it is possible to increase transmission power of the wireless communicator 10 so that an attenuation amount to be estimated may be reduced, or to change to a bandwidth or to a modulation method with which attenuation by precipitation can be made smaller. Meanwhile, when there is neither precipitation nor a position change (in operation S403; NO and in operation S404; NO), estimation of attenuation and a rain rate and update of wireless communication parameters is not carried out.

3.3) Effect

As mentioned above, since a future attenuation amount is estimated from time series attenuation amounts up to the present, and, furthermore, it is possible to calculate a rainfall rate and an estimated value of a rainfall rate using a physical distance between the wireless communicators, this exemplary embodiment has the same effect as that of the second exemplary embodiment. Furthermore, by recording location information on the wireless communicators 10 and 11 in time series, position changes of the both can be detected, and, even when the wireless communicators move, correct wireless communication control according to the weather situation becomes possible.

4. Fourth Embodiment

4.1) System Configuration

Figure 7:
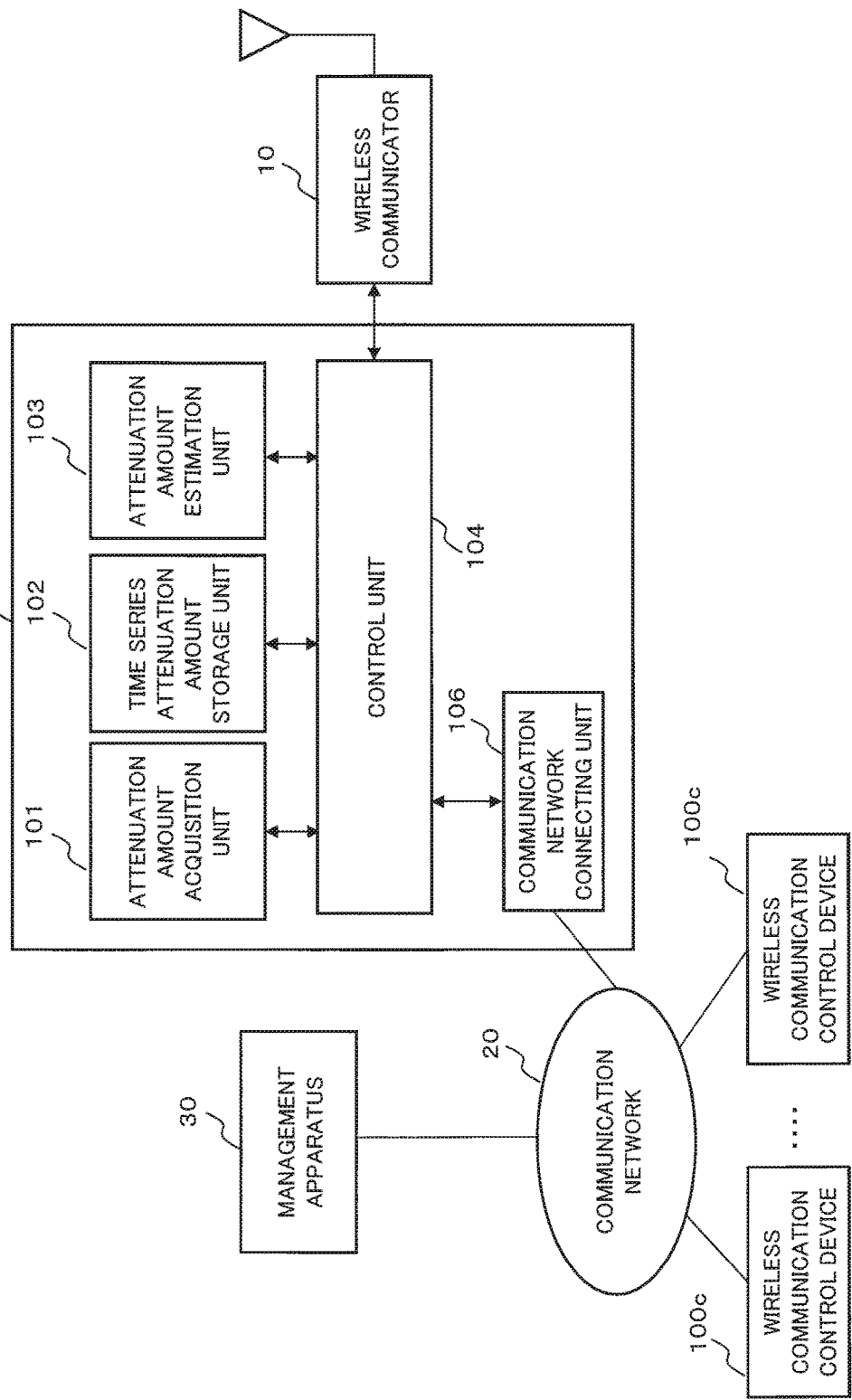
FIG. 7 is a block diagram showing a schematic structure of a wireless communication control device in a wireless communication system according to a fourth exemplary embodiment of the present invention.

As shown in FIG. 7, a wireless communication control device 100c according to the fourth exemplary embodiment of the present invention has a structure made by adding a communication network connecting unit 106 to the wireless communication control device 100 according to the first exemplary embodiment. Accordingly, the identical reference numbers are attached to blocks having the same functions as those of FIG. 1, and detailed description of them will be omitted.

The communication network connecting unit 106 is an interface with a communication network 20, and can communicate with such as another piece of wireless communication control device 100c and a management apparatus 30 of a wireless communication system and the like mutually through the communication network 20. The wireless communication control device 100c can notify other wireless communication control devices or the management apparatus 30 of a result estimated using time series attenuation amounts as mentioned later. The communication network 20 is a packet communication network, for example.

4.2) Operations

Figure 8:
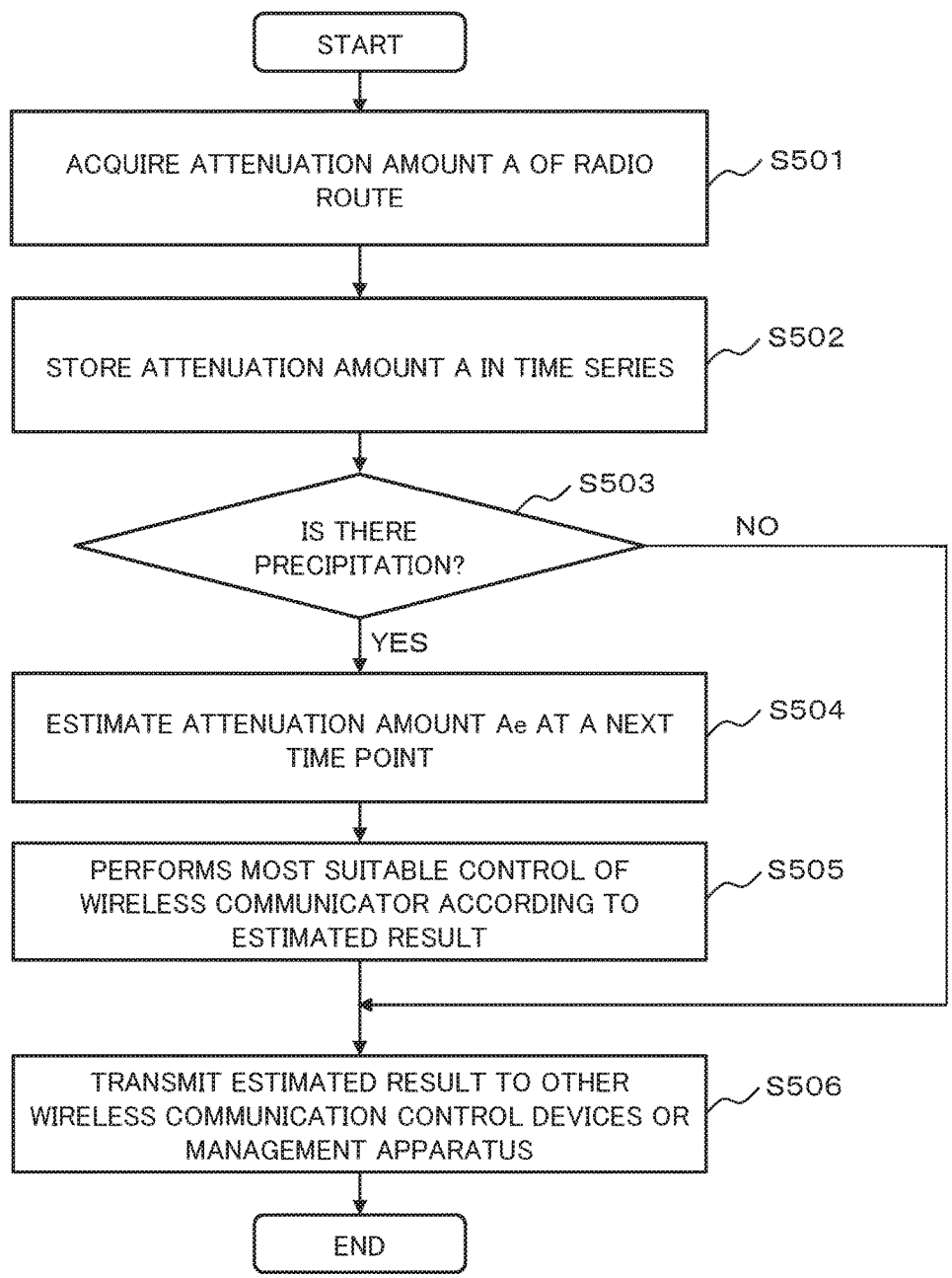
FIG. 8 is a flow chart showing a wireless communication control method according to the fourth exemplary embodiment.

Because the operations S501-S505 in FIG. 8 are the same as the operations S201-S205 in FIG. 2, description will be omitted. As has been already stated, the control unit 104 performs most suitable control of wireless communication parameters of the wireless communicator 10 according to estimated attenuation amount Ae (operation S505), and, then, the control unit 104 transmits estimated attenuation amount Ae to the other wireless communication control devices and the management apparatus 30 through the communication network connecting unit 106 (operation S506).

4.3) Effect

As mentioned above, according to this exemplary embodiment, the same effect as that of the first exemplary embodiment can be obtained, and, in addition, by one device notifying the other wireless communication control devices of an estimated attenuation amount, wireless control considering the attenuation amount of the one device becomes possible in the other wireless communication control devices.

5. Other Embodiments

The present invention is not limited to the first-fourth exemplary embodiments mentioned above, and the exemplary embodiments described below are also included in the present invention.

Fifth Exemplary Embodiment

Figure 9:
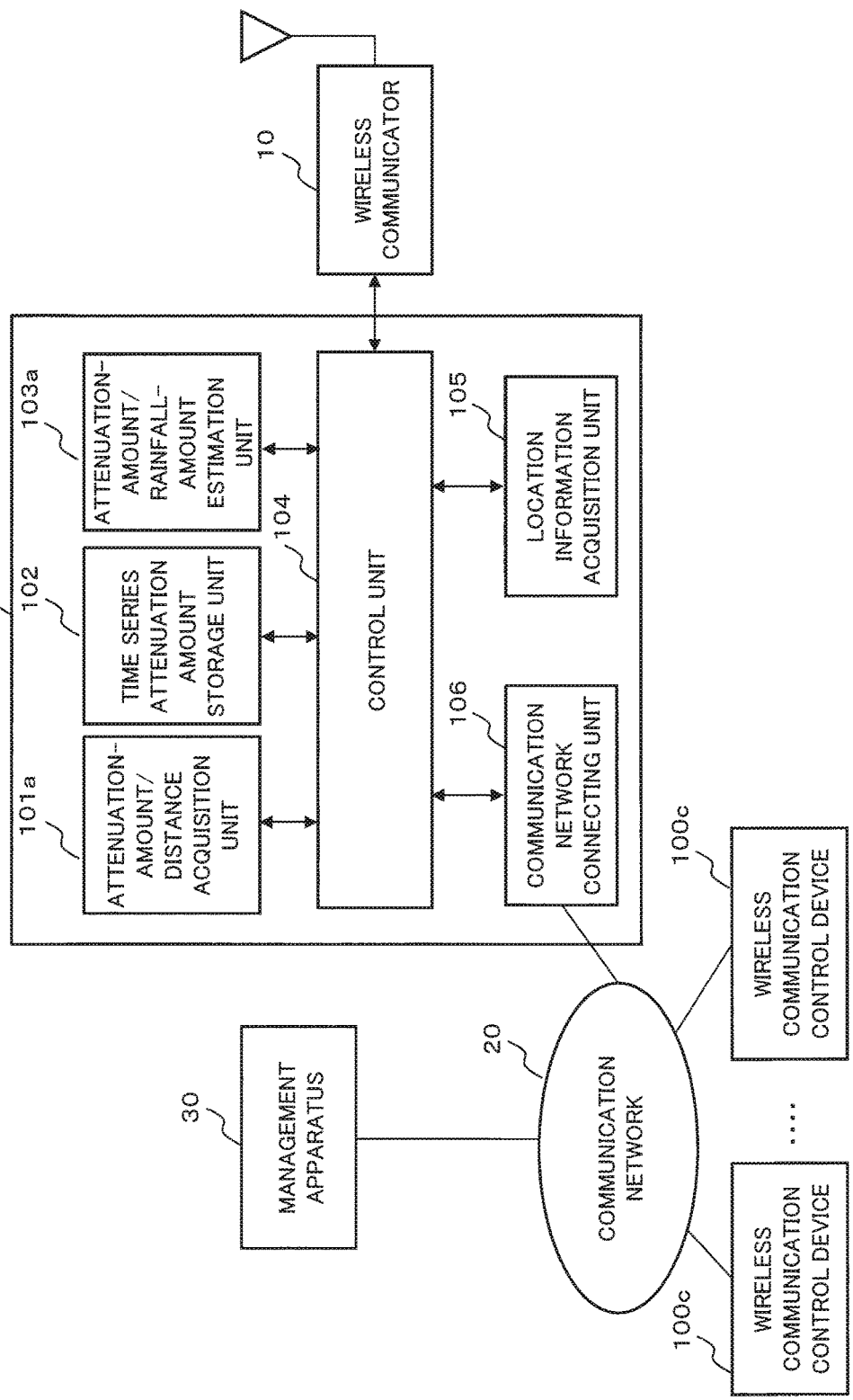
FIG. 9 is a block diagram showing a schematic structure of a wireless communication control device in a wireless communication system according to a fifth exemplary embodiment of the present invention.

As shown in FIG. 9, a wireless communication control device 100d according to the fifth exemplary embodiment of the present invention has a structure made by adding the communication network connecting unit 106 in the fourth exemplary embodiment to the wireless communication control device 100b according to the third exemplary embodiment. This is a combination of the functions described in the third and fourth exemplary embodiments mentioned above, and, thus, details of this exemplary embodiment is omitted.

Sixth Embodiment

As shown in FIG. 10, according to the sixth exemplary embodiment of the present invention, the functions of the wireless communication control devices according to the first-third exemplary embodiments mentioned above and the function of the wireless communicator 10 can be included in one wireless communication apparatus 600. In other words, the wireless communication apparatus 600 according to this exemplary embodiment has a radio transceiver 601 for performing wireless communication with other wireless communication apparatus, and a wireless communication control unit 602 having the function of the wireless communication control device according to the above-mentioned exemplary embodiments. In FIG. 10, although the function of the wireless communication control unit 602 is the same as that of the first exemplary embodiment, it may be the same as that of the wireless communication control device 100a or 100b according to the second and third exemplary embodiments.

Seventh Embodiment

As shown in FIG. 11, according to the seventh exemplary embodiment of the present invention, the functions of wireless communication control devices according to the fourth and fifth exemplary embodiments mentioned above and the function of the wireless communicator 10 can be also included in one wireless communication apparatus 600a. In other words, the wireless communication apparatus 600a according to this exemplary embodiment has the radio transceiver 601 for performing wireless communication with other wireless communication apparatus, and a wireless communication control unit 602a having the same function as that of a wireless communication control device according to the above-mentioned exemplary embodiments. In FIG. 11, although the function of the wireless communication control unit 602a is the same as that of the fourth exemplary embodiment, it may be the same as that of the wireless communication control device 100d according to the fifth exemplary embodiment.

According to this exemplary embodiment, it becomes possible that a radio/weather situation monitor 300 collects an attenuation amount or a rain rate estimated by each piece of wireless communication apparatus 600a from each piece of wireless communication apparatus 600a, and determine a weather situation correctly.

6. Supplementary Notes

Part of or all of the exemplary embodiments mentioned above can also be described like the following supplementary notes, but not limited to these.
(Supplementary Note 1)
A wireless communication control device controlling a wireless communicator, the wireless communication control device comprising:
an attenuation amount estimating unit that estimates a future attenuation amount from history of an attenuation amount of radio field intensity from another wireless communicator to the wireless communicator; and
a control unit that controls the wireless communicator based on the estimated attenuation amount.
(Supplementary Note 2)
The wireless communication control device according to supplementary note 1, wherein
the control unit that distinguishes presence or absence of precipitation by comparing a latest attenuation amount and a precipitation threshold value, and, when it is determined that there is precipitation, makes the attenuation amount estimating unit estimates the future attenuation amount.
(Supplementary Note 3)
The wireless communication control device according to supplementary note 1, wherein
the control unit that detects a latest precipitation situation based on a latest attenuation amount and a distance to the other wireless communicator, and, when it is determined that there is precipitation, makes the attenuation amount estimating unit estimate the future attenuation amount.
(Supplementary Note 4)
The wireless communication control device according to supplementary note 3, wherein
the attenuation amount estimating unit that estimates a future rain rate based on the estimated attenuation amount and the distance to the other wireless communicators.
(Supplementary Note 5)
The wireless communication control device according to any one of supplementary notes 2 to 4, further comprising
a location acquisition unit that acquires geographical location information on itself, and wherein
the control unit makes, when there is precipitation or when a relative position to the other wireless communicator is changed, the attenuation amount estimating unit estimate the future attenuation amount.
(Supplementary Note 6)
The wireless communication control device according to any one of supplementary notes 1 to 5, wherein
the attenuation amount estimating unit that extracts by a machine learning method time series variation of an attenuation amount from history of the attenuation amount and estimates the future attenuation amount.
(Supplementary Note 7)
A wireless communication control method for controlling a wireless communicator, the method comprising:

estimating, by an attenuation amount estimating unit, a future attenuation amount from history of an attenuation amount of radio field intensity from another wireless communicator to the wireless communicator; and controlling, by a control unit, the wireless communicator based on the estimated attenuation amount.

(Supplementary Note 8)

The wireless communication control method according to supplementary note 7, wherein the control unit distinguishes presence or absence of precipitation by comparing a latest attenuation amount and a precipitation threshold value, and wherein, when it is determined that there is precipitation, the control unit makes the attenuation amount estimating unit estimate the future attenuation amount.

(Supplementary Note 9)

The wireless communication control method according to supplementary note 7, wherein the control unit detects a latest precipitation situation based on a latest attenuation amount and a distance to the other wireless communicator, and wherein, when it is determined that there is precipitation, the control unit makes the attenuation amount estimating unit estimate the future attenuation amount.

(Supplementary Note 10)

The wireless communication control method according to supplementary note 9, wherein the attenuation amount estimating unit estimates a future rain rate based on the estimated attenuation amount and a distance to the other wireless communicators.

(Supplementary Note 11)

The wireless communication control method according to any one of supplementary notes 8-10, wherein further includes a location acquisition unit that acquirers geographical location information on the wireless communicator; and wherein the control unit makes, when there is precipitation or when a relative position to the other wireless communicator has been changed, the attenuation amount estimating unit estimate the future attenuation amount.

(Supplementary Note 12)

The wireless communication control method according to any one of supplementary notes 7 to 11, wherein the attenuation amount estimating unit extracts by a machine learning method time series variation of the attenuation amount from history of the attenuation amount to estimate the future attenuation amount.

(Supplementary Note 13)

A wireless communication system including a wireless communicator and a wireless communication control device to control the wireless communicator, the system comprising:

an attenuation amount estimating unit that estimates a future attenuation amount from history of an attenuation amount of radio field intensity from another wireless communicator to the wireless communicator; and a control unit that controls the wireless communicator based on the estimated attenuation amount.

(Supplementary Note 14)

The wireless communication system according to supplementary note 13, wherein the control unit distinguishes presence or absence of precipitation by comparing a latest attenuation amount and a precipitation threshold value, and, when it is determined that there is precipitation, makes the attenuation amount estimating unit estimate the future attenuation amount.

(Supplementary Note 15)

The wireless communication system according to supplementary note 13, wherein the control unit detects a latest precipitation situation based on a latest attenuation amount and a distance to the other wireless communicator, and, when it is determined that there is precipitation, makes the attenuation amount estimating unit estimate the future attenuation amount.

(Supplementary Note 16)

The wireless communication system according to supplementary note 15, wherein the attenuation amount estimating unit estimates a future rain rate based on the estimated attenuation amount and the distance to the other wireless communicators.

(Supplementary Note 17)

The wireless communication system according to any one of supplementary notes 14 to 16, wherein the wireless communicator further includes a location acquisition unit to acquire geographical location information, and wherein the control unit makes, when there is precipitation or when a relative position to the other wireless communicator is changed, the attenuation amount estimating unit estimate the future attenuation amount.

(Supplementary Note 18)

The wireless communication system according to any one of supplementary notes 13 to 17, wherein the attenuation amount estimating unit extracts by a machine learning method time series variation of the attenuation amount from history of the attenuation amount and estimates the future attenuation amount.

(Supplementary Note 19)

The wireless communication system according to any one of supplementary notes 13 to 18, wherein the wireless communicator and the wireless communication control device are provided in one wireless communication apparatus.

(Supplementary Note 20)

The wireless communication system according to any one of supplementary notes 13 to 19, further comprising a communication network, wherein the wireless communication control device and a management apparatus are connected to the communication network, and wherein the wireless communication control device transmits the estimated attenuation amount to the management apparatus through the communication network.

(Supplementary Note 21)

The wireless communication system according to supplementary note 16, further comprising a communication network, wherein the wireless communication control device and a management apparatus are connected to the communication network, and wherein the wireless communication control device transmits at least one of the estimated attenuation amount and the estimated rain rate to the management apparatus through the communication network.

(Supplementary Note 22)

A wireless communication apparatus capable of performing wireless communication with another wireless communication apparatus, comprising:

a wireless communication unit that performs wireless communication;

an attenuation amount estimating unit that estimates a future attenuation amount from history of an attenuation amount of radio field intensity from the other wireless communication apparatus to the wireless communication apparatus; and a control unit that controls the wireless communication unit based on the estimated attenuation amount.

(Supplementary Note 23)

A program that makes a computer function as a wireless communication control device to control a wireless communicator, the program making the computer realize:

an attenuation amount estimation function to estimate a future attenuation amount from history of an attenuation amount of radio field intensity from another wireless communicator to the wireless communicator; and a control function to control the wireless communicator based on the estimated attenuation amount.

INDUSTRIAL APPLICABILITY

The present invention is applicable in a wireless communication control technology in a wireless communication system in an environment where a radio field intensity attenuates by a weather situation.

As above, the present invention has been described taking the exemplary embodiments mentioned above as an exemplary example. However, the present invention is not limited to the exemplary embodiments mentioned above. In other words, in the present invention, various aspects which a person skilled in the art can understand can be applied within the scope of the present invention.

This application claims priority based on Japanese application Japanese Patent Application No. 2014-091965 filed on Apr. 25, 2014, the disclosure of which is incorporated herein in its entirety by reference.

REFERENCE SIGNS LIST 10 and 11 Wireless communicator
20 Communication network
30 Management apparatus/monitor
100, and 100a-100d Wireless communication control device
101 Attenuation amount acquisition unit
101a Attenuation-amount/distance acquisition unit
102 Time series attenuation amount storage unit
103 Attenuation amount estimation unit
103a Attenuation-amount/rainfall-amount estimation unit
104 Control unit
105 Location information acquisition unit
106 Communication network connecting unit
601 Radio transceiver
602 and 602a Radio communication control unit

What is claimed is:

1. A wireless communication control device controlling a first wireless communicator, the wireless communication control device comprising:
    an attenuation amount estimating unit that estimates a future attenuation amount from history of an attenuation amount of radio field intensity due to weather conditions from a second wireless communicator to the first wireless communicator; and
    a control unit that detects a latest precipitation situation based on a latest attenuation amount and a distance to the second wireless communicator, and, when it is determined that there is precipitation, makes the attenuation amount estimating unit estimate the future attenuation amount and controls wireless line quality according to the estimated future attenuation amount.

2. The wireless communication control device according to claim 1, wherein
    the control unit that distinguishes presence or absence of precipitation by comparing a latest attenuation amount and a precipitation threshold value, and, when it is determined that there is precipitation, makes the attenuation amount estimating unit estimate the future attenuation amount.

3. The wireless communication control device according to claim 2, further comprising
    a location acquisition unit that acquires geographical location information on the first wireless communicator, wherein
    the control unit makes, when there is precipitation or when a relative position to the second wireless communicator is changed, the attenuation amount estimating unit estimate the future attenuation amount.

4. The wireless communication control device according to claim 1, wherein
    the attenuation amount estimating unit that estimates a future rain rate based on the estimated attenuation amount and the distance to the second wireless communicators.

5. A wireless communication apparatus capable of performing wireless communication with another communication apparatus, the wireless communication apparatus comprising:
    a wireless communication unit that performs wireless communication;
    the wireless communication control device according to claim 1.

6. A wireless communication control method for controlling a first wireless communicator, the method comprising:
    estimating, by an attenuation amount estimating unit of a wireless communication control device, a future attenuation amount from history of an attenuation amount of radio field intensity due to weather conditions from a second wireless communicator to the first wireless communicator; and
    controlling, by a control unit of the wireless communication control device, detects a latest precipitation situation based on a latest attenuation amount and a distance to the second wireless communicator, and, when it is determined that there is precipitation, makes the attenuation amount estimating unit estimate the future attenuation amount and controls wireless line quality according to the estimated future attenuation amount.

7. A wireless communication system including a first wireless communicator, a second wireless communicator, and a wireless communication control device to control the first wireless communicator, the wireless communication control device comprising:
    an attenuation amount estimating unit that estimates a future attenuation amount from history of an attenuation amount of radio field intensity due to weather conditions from the second wireless communicator to the first wireless communicator; and
    a control unit that detects a latest precipitation situation based on a latest attenuation amount and a distance to the second wireless communicator, and, when it is determined that there is precipitation, makes the attenuation amount estimating unit estimate the future attenuation amount and controls wireless line quality according to the estimated future attenuation amount.

8. The wireless communication system according to claim 7, further comprising
    a communication network, wherein the wireless communication control device and a management apparatus are connected to the communication network, and wherein the wireless communication control device transmits the estimated attenuation amount to the management apparatus through the communication network.

9. A non-transitory computer-readable recording medium storing a program that makes a computer function as a wireless communication control device to control a first wireless communicator, the program making the wireless communication control device realize:
   an attenuation amount estimation function to estimate a future attenuation amount from history of an attenuation amount of radio field intensity due to weather conditions from a second wireless communicator to the first wireless communicator; and
   a control function to detect a latest precipitation situation based on a latest attenuation amount and a distance to the second wireless communicator, and, when it is determined that there is precipitation, makes the attenuation amount estimating unit estimate the future attenuation amount and controls wireless line quality according to the estimated future attenuation amount.

10. The wireless communication control device to claim 1,
    wherein the attenuation amount estimating unit that estimates the future attenuation amount for a single radio path from the second wireless communicator to the first wireless communicator.

11. The wireless communication control method for controlling a first wireless communicator according to claim 6,
    wherein the attenuation amount estimating unit that estimates the future attenuation amount for a single path from the second wireless communicator to the first wireless communicator.

12. The wireless communication control system according to claim 7,
    wherein the attenuation amount estimating unit that estimates the future attenuation amount for a single radio path from the second wireless communicator to the first wireless communicator.

13. The non-transitory computer-readable recording medium storing the program that makes a computer function as a wireless communication control device to control the first wireless communicator, the program making the wireless communication control device according to claim 9,
    wherein the attenuation amount estimating function to estimate the future attenuation amount for a single radio path from the second wireless communicator to the first wireless communicator.

* * * * *